United States Patent [19]

Furukawa

[11] Patent Number: 5,622,080
[45] Date of Patent: Apr. 22, 1997

[54] SAFETY INTERLOCK FOR PREVENTING DOUBLE ENGAGEMENT OF FORWARD AND REVERSE DOG CLUTCHES AND SHAFT CLUTCH

[75] Inventor: Toshiharu Furukawa, Susono, Japan

[73] Assignee: Toyota Jidosha Kabushiki Kaisha, Toyota, Japan

[21] Appl. No.: 556,194

[22] Filed: Nov. 9, 1995

[30] Foreign Application Priority Data

Nov. 22, 1994 [JP] Japan ..................... 6-287933

[51] Int. Cl.$^6$ .................. F16H 61/12; F16H 61/18
[52] U.S. Cl. .................. 74/335; 477/125; 477/126; 477/79
[58] Field of Search .................. 477/70, 77, 79, 477/86, 125, 126, 906; 74/335, 336 R

[56] References Cited

FOREIGN PATENT DOCUMENTS 63-31031  6/1988  Japan .

Primary Examiner—Khoi Q. Ta
Attorney, Agent, or Firm—Oblon, Spivak, McClelland, Maier & Neustadt, P.C.

[57] ABSTRACT

A hydraulic control system for an automatic transmission of multiple clutch type (in FIG. 1), comprising an R cut valve 80 (and a 2-R sequence valve 70) whose positions are shifted in interlocking with the operations of dog clutches $D_2$ ($D_r$), and which control the supply of working oil to hydraulic actuators $S_r$ ($S_2$) corresponding to the other dog clutches $D_r$ ($D_2$) mounted on an identical one of power transmission shafts, so as to prohibit the engagement of the other dog clutches $D_r$ ($D_2$), in a state in which the dog clutches $D_2$ ($D_r$) are engaged with speed change gears for the first or fourth speed stage (the reverse gear stage). Thus, even when the specified dog clutches $D_2$ and $D_r$ are unintentionally engaged due to the fails thereof or the response delay of the hydraulic control system, the circulation of power is prevented from taking place.

3 Claims, 5 Drawing Sheets

FIG.3

| | | SoL A | SoL B | S1 1N3 | S2 2N4 | SR | Sol. 1 | Sol. 2 | C1 | C2 |
|---|---|---|---|---|---|---|---|---|---|---|
| P | | × | × | 1 | N | N | — | — | × | × |
| R | | × | × | 1 | N | R | × | × | × | ○ |
| N | | × | × | 1 | N | N | — | — | × | × |
| D | 1 | × | ○ | 1 | 2 | N | × | ○ | ○ | × |
| D | 2 | × | ○ | 1 | 2 | N / V>←65km/h | ○ | × | × | ○ |
| D | 2 | × | × | 3 | 2 | N / V>←65km/h | ○ | × | × | ○ |
| D | 3 | × | × | 3 | 2 | N / V>←115km/h | × | ○ | ○ | × |
| D | 3 | ○ | × | 3 | 4 | N / V>←115km/h | × | ○ | ○ | × |
| S | 4 | ○ | × | 3 | 4 | N | ○ | × | × | ○ |
| L | 1 | × | ○ | 1 | 2 | N | ○ | × | ○ | × |
| L | 2 | × | ○ | 1 | 2 | N / V>←65km/h | × | ○ | × | ○ |
| L | 2 | × | × | 3 | 2 | N / V>←65km/h | × | ○ | × | ○ |
| L | 3 | × | × | 3 | 2 | N / V>←115km/h | ○ | × | ○ | × |
| L | 3 | ○ | × | 3 | 4 | N / V>←115km/h | ○ | × | ○ | × |

SAFETY INTERLOCK FOR PREVENTING DOUBLE ENGAGEMENT OF FORWARD AND REVERSE DOG CLUTCHES AND SHAFT CLUTCH

BACKGROUND OF THE INVENTION

1. Field of the Invention

The present invention relates to automatic transmissions, and more particularly to a hydraulic control system for an automatic transmission of multiple clutch type.

2. Description of the Prior Art

There has heretofore been known an automatic transmission of multiple clutch type having two power transmission shafts each of which transmits power from a driving source such as engine to driving wheels, and having shaft clutches each of which connects or disconnects the corresponding power transmission shaft on a power transmission path (refer to, for example, the official gazette of Japanese Patent Application Publication No. 31031/1988).

The multiple clutch type automatic transmission mentioned above is furnished on the power transmission shafts with a gear shift mechanism which comprises a plurality of speed change gear and dog clutches. The dog clutches select any one of the plurality of speed change gears and render the selected gears capable of transmitting the power. In general, the dog clutches and the aforementioned shaft clutches are selectively engaged by actuating hydraulic cylinders. As a result, any one of the speed change gears mounted on either power transmission shaft is selected to form a specific speed stage.

In the prior-art automatic transmission of the multiple clutch type, however, the fails of the hydraulic cylinders and those of the dog clutches themselves are not especially considered. Accordingly, in a case where the dog clutches have been erroneously engaged by the fails, it is apprehended that the power will circulate due to double engagement, or that the forward range of a motor vehicle will be kept in spite of the reverse range thereof, or vice versa.

SUMMARY OF THE INVENTION

The present invention has been made in view of the drawbacks of the prior art as stated above. Concretely, it has for its object to provide a hydraulic control system for an automatic transmission of multiple clutch type in which the fails of hydraulic cylinders and those of dog clutches themselves in the multiple clutch type automatic transmission are taken into consideration, and which, even when such fails have arisen, can prevent the occurrences of the problems that power circulates due to double engagement, and that the forward range of a motor vehicle is kept in spite of the reverse range thereof, or vice versa.

The present invention has achieved above object by adopting the structure as defined in claims 1, 2 or 3.

According to the present invention, in order to prevent the above problems from occurring even when any of the hydraulic cylinders and the dog clutches themselves has failed, a cut valve whose positions are shifted in interlocking with the certain dog clutch is additionally provided to the hydraulic control system in the prior art.

In the present invention as defined in claim 1, in the case where the certain dog clutch has selected one of the speed change gears so as to select the specific speed change gear capable of transmitting the power, the cut valve controls the supply of the working oil to the hydraulic actuator corresponding to the other dog clutch mounted on the same power transmission shaft on which the certain dog clutch is mounted, so as to prohibit the engagement of the other dog clutch. As a result, when the certain dog clutch is transferred into an engaged state in which the specified speed change gear is capable of transmitting the power, the other dog clutch mounted on the same power transmission shaft is forcibly transferred into a disengaged state in interlocking with the operation of the certain dog clutch by the function of the cut valve. It is therefore possible to prevent the double engagement in which the plurality of dog clutches mounted on the same power transmission shaft are simultaneously engaged.

In the present invention as defined in claim 2, a similar concept is applied to the fail-safe for the forward range and the reverse range.

More specifically, claim 2 relates to the hydraulic control system for the automatic transmission of multiple clutch type, in which the speed change gears for the forward gear stages and the speed change gear for the reverse gear stage are arranged on the "identical" power transmission shaft, and any one of the speed change gears is selected to transmit the power by the dog clutches. In the hydraulic control system, when the reverse range has been selected, and when the dog clutch corresponding to the forward range renders either of the speed change gears for the forward gear stages capable of transmitting the power (due to, e.g., the fail of this dog clutch or the response delay of the hydraulic control system), the added cut valve prohibits the engagement of the shaft clutch which connects (or disconnects) the "identical" power transmission shaft. As a result, even when the dog clutch for the forward range has failed or cannot quickly respond to the range shift due to the response delay, the power transmission path including this dog clutch is cut off, in other words, this dog clutch is brought into a neutral state. It is therefore possible to prevent the forward range from being kept in spite of the selection of the reverse range.

In the present invention as defined in claim 3, quite the same operation is applied to the fail-safe in the case of the selection of the forward range. More specifically, in the case where, in spite of the selection of the forward range, the dog clutch for the reverse range lies at a position which renders the speed change gear for the reverse gear stage capable of transmitting the power, the cut valve prohibits the engagement of the shaft clutch corresponding to the pertinent power transmission path. It is therefore possible to prevent the reverse range from being kept in spite of the selection of the forward range.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein:

FIG. 3 is a table showing the operating states of dog clutches and solenoids which are included in the automatic transmission;

DETAILED DESCRIPTION OF THE PREFERRED EMBODIMENT

Now, an embodiment of the present invention will be described in detail with reference to the drawings.

Figure 2:
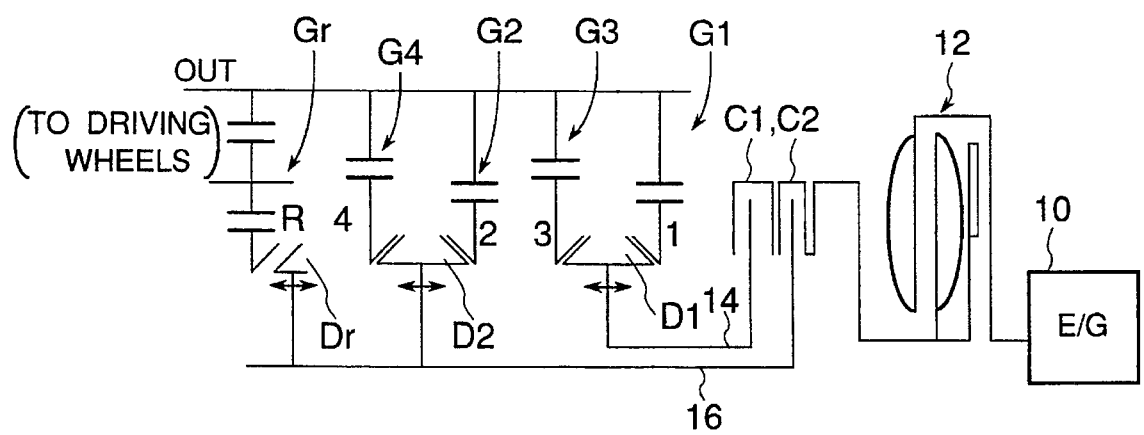
FIG. 2 is a schematic diagram showing the power transmission system of an automatic transmission of twin clutch type to which the present invention is applied.

FIG. 2 illustrates the outline of the power transmission system of an automatic transmission of twin clutch type to which the present invention is applied. The twin clutch type automatic transmission includes two power transmission shafts 14, 16 each of which transmits power from an engine 10 being a driving source, to the unshown driving wheels of a motor vehicle through a torque converter 12. The respective power transmission shafts 14, 16 are furnished with shaft clutches $C_1$, $C_2$ which connect or disconnect the corresponding shafts 14, 16 on power transmission paths, in other words, which activate or deactivate the power transmissions of the corresponding power transmission shafts 14, 16.

Arranged on the power transmission shaft 14 are a speed change gear $G_1$ for forming the first speed of the motor vehicle, a speed change gear $G_3$ for forming the third speed thereof, and a dog clutch $D_1$ for selecting either of the speed change gears $G_1$, $G_3$ and rendering the selected gear capable of transmitting the power. Also, arranged on the power transmission shaft 16 are a speed change gear $G_2$ for forming the second speed of the motor vehicle, a speed change gear $G_4$ for forming the fourth speed thereof, and a dog clutch $D_2$ for selecting either of the speed change gears $G_2$, $G_4$ and rendering the selected gear capable of transmitting the power. Further, the power transmission shaft 16 is furnished with a speed change gear $G_r$ for forming the reverse gear stage of the motor vehicle, and a dog clutch $D_r$ for rendering the gear $G_r$ capable of transmitting the power. Incidentally, each of the dog clutches $D_1$, $D_2$ and $D_r$ can be brought into a neutral state in which it does not engage with any speed change gear.

In the twin clutch type automatic transmission having such a power transmission system, when the first speed is to be formed by way of example, the shaft clutch $C_1$ is brought into engagement, and the dog clutch $D_1$ is engaged with the side of the speed change gear $G_1$ for forming the first speed. On this occasion, the shaft clutch $C_2$ is held in a released state, so that the power of the engine 10 is not transmitted to the side of the power transmission shaft 16. However, the dog clutch $D_2$ on this shaft 16 is not held in the neutral state, but it is previously engaged with the second speed side thereof (with the second gear $G_2$) in preparation for an upshift from the first speed to the second speed.

In case of carrying out the gear shift from the first speed to the second speed by way of example, the shaft clutch $C_1$ is released, whereby the power from the engine 10 is not transmitted to the power transmission shaft 14, and the shaft clutch $C_2$ is engaged, whereby the power of the engine 10 is introduced to only the side of the power transmission shaft 16. Since the dog clutch $D_2$ has been engaged with the side of the speed change gear $G_2$ for the second speed beforehand, the 1→2 ("first speed" to "second speed") gear shift can be carried out merely by changing-over the shaft clutches $C_1$ and $C_2$.

Meanwhile, in the drive of the motor vehicle at the second speed, the dog clutch $D_1$ mounted on the power transmission shaft 14 is operated in accordance with the speed of the motor vehicle. More specifically, this dog clutch $D_1$ is previously engaged with the side of the speed change gear $G_1$ for the first speed when a 2→1 downshift is likely to occur, and with the side of the speed change gear $G_3$ for the third speed when a 2→3 upshift is likely to occur.

Such operations are tabulated in FIG. 3. The contents of the table of this figure will be clearly understood from the explanation of FIG. 5 below.

By the way, in forming the reverse gear stage, the shaft clutch $C_2$ is brought into engagement with the dog clutch $D_r$ engaged, and the other shaft clutch $C_1$ and dog clutches $D_1$, $D_2$ are all brought into the neutral states.

Next, the hydraulic control system of the automatic transmission of the twin clutch type will be explained.

Figure 5:
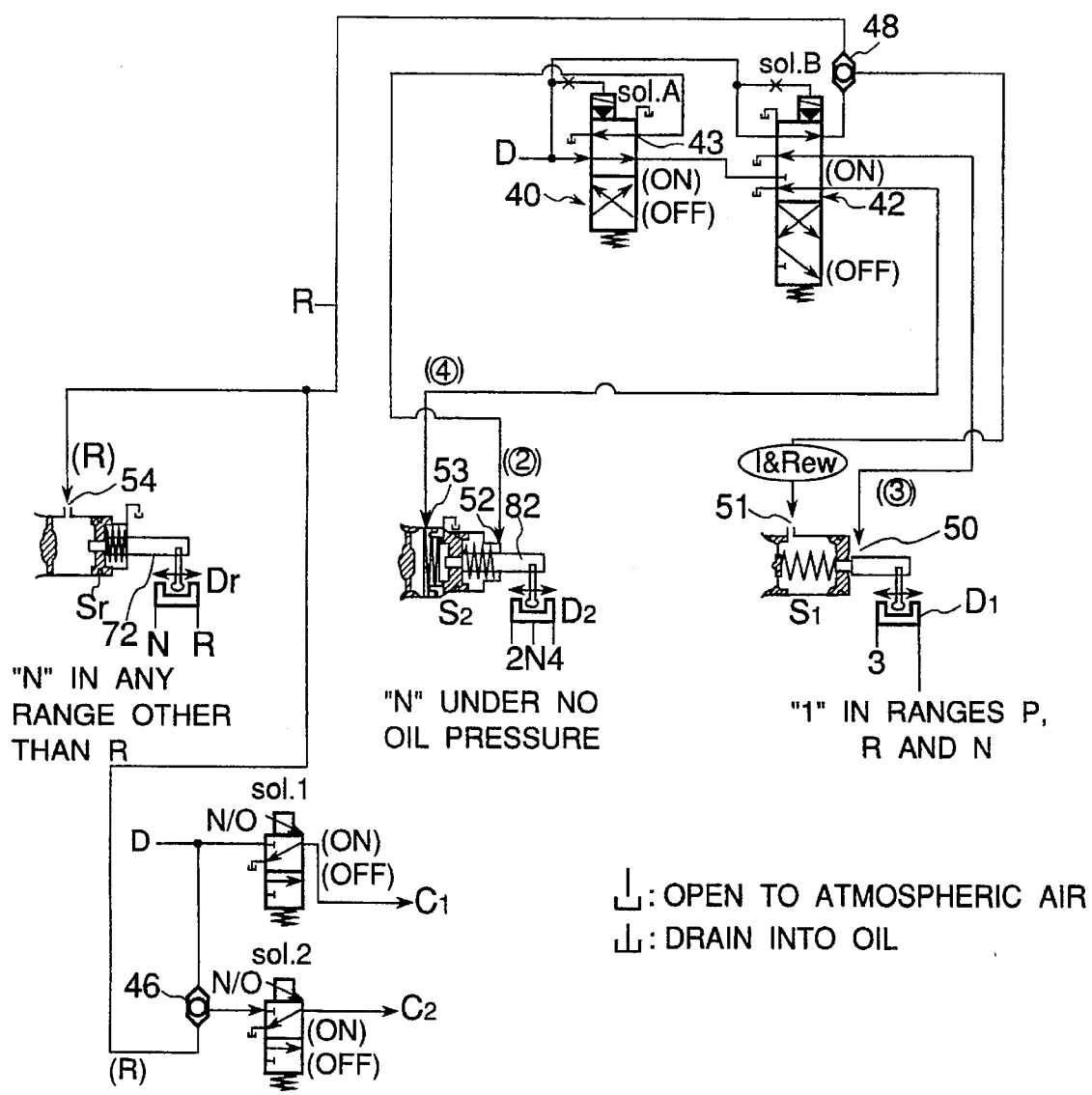
FIG. 5 is a diagram showing the basic arrangement of a hydraulic control circuit which is not endowed with the fail-safe functions of the hydraulic control circuit depicted in FIG. 1.

In order to facilitate the understanding of this embodiment, a basic hydraulic control circuit (corresponding to a prior-art example) which is not endowed with fail-safe functions according to this embodiment shall be first explained, and thereafter the description of a hydraulic control circuit in this embodiment will follow. FIG. 5 illustrates the basic hydraulic control circuit which has no fail-safe function.

Referring to FIG. 5, symbols "Sol. 1" and "Sol. 2" denote solenoids which change-over the engaged and released states of the respective shaft clutches $C_1$ and $C_2$ through the direct controls of engagement pressures. Symbols "Sol.A" and "Sol.B" denote solenoids for changing-over respective shift valves 40 and 42. The shift valves 43 and 42 serve to control the supply and cutoff of working oil to hydraulic actuators $S_1$ and $S_2$ for changing-over the respective dog clutches $D_1$ and $D_2$, in accordance with the combinations of the shift positions thereof.

Further, numerals 46 and 48 in FIG. 5 designate shuttle valves, and symbol "$S_r$" does a hydraulic actuator corresponding to the dog clutch $D_r$. Besides, each ON position of the solenoids Sol.A, Sol.B and the shift valves 40, 42 is depicted on respective upper sides of the figure and each OFF position on respective lower sides thereof.

The hydraulic actuator $S_1$ and $S_2$ have two corresponding ports 50, 51 and 52, 53 respectively. When the oil is supplied into either of the two ports, the dog clutch $D_1$ or $D_2$ is brought into engagement so that the speed change gear corresponding to the specific speed stage may become capable of transmitting the power. On the other hand, when the oil is supplied into neither of the two ports, the dog clutch $D_1$ or $D_2$ is brought into the neutral state. Besides, the hydraulic actuator $S_r$ has only one port 54. The dog clutch $D_r$ is engaged with the reverse side when the oil is supplied into the port 54, and it is rendered neutral when not.

In such a hydraulic control circuit, the first speed of the motor vehicle is formed as stated below. As seen from FIG. 3, the solenoid Sol 1 is turned "OFF" the solenoid Sol.2 "ON", the solenoid Sol.A "OFF" and the solenoid Sol.B "ON" at the first speed stage.

As a result, the oil fed from the D-range port D of a manual valve, not shown, is supplied to the shaft clutch $C_1$ through the solenoid Sol.1. Thus, the shaft clutch $C_1$ is brought into the engaged state.

On the other hand, the oil fed from the D-range port D of the manual valve is also supplied to the shift valves 40 and 42 independently of the above supply to the shaft clutch $C_1$. Since the solenoid Sol.A is held in the OFF state, the shift valve 40 assumes the lower position as viewed in FIG. 5, and the supplied oil enters the second-speed-side port 52 of the hydraulic actuator $S_2$ corresponding to the dog clutch $D_2$. As a result, the dog clutch $D_2$ is changed-over to the second speed side and stands-by for the 1→2 gear shift under this state. Moreover, since the solenoid Sol.B is held in the ON state, the shift valve 42 assumes the upper position as viewed in FIG. 5, and the supplied oil enters the "1 & reverse" port 51 of the hydraulic actuator $S_1$ corresponding to the dog clutch $D_1$, thereby to change-over this dog clutch $D_1$ to the first speed side.

The shift from the first speed stage to the second speed stage can be realized merely by changing-over the shaft clutches $C_1$ and $C_2$ through the changes-over of the solenoids Sol.1 and Sol.2, because the dog clutch $D_2$ is standing-by on the second speed side.

In the drive of the motor vehicle at the second speed stage, when the vehicle speed V has exceeded 65 [km/h], the solenoid Sol.B is turned OFF, whereby the dog clutch $D_1$ is changed-over from to the third gear side. Accordingly, insofar as the shift from the second speed stage to the third speed stage is to be effected at the vehicle speed higher than 65 [km/h], the shift is realized merely by changing-over from the released state of the shaft clutch $C_1$ and the engaged state of the shaft clutch $C_2$, to the engaged state of the shaft clutch $C_1$ and the released state of the shaft clutch $C_2$ through the changes-over of the ON and OFF states of the solenoids Sol.1 and Sol.2. When the shift is to be effected at the vehicle speed of 65 [km/h] or below, the turn-OFF of the solenoid Sol.B and the changes-over of the ON and OFF states of the solenoids Sol.1 and Sol.2 are simultaneously carried out.

In the drive of the motor vehicle at the third speed stage, when the vehicle speed V has exceeded 115 [km/h], the solenoid Sol.A is turned ON, whereby the dog clutch $D_2$ is changed-over to the fourth speed side. Accordingly, insofar as the shift from the third speed stage to the fourth speed stage is to be effected at the vehicle speed higher than 115 [km/h], the shift is realized merely by changing-over from the engaged state of the shaft clutch $C_1$ and the released state of the shaft clutch $C_2$, to the released state of the shaft clutch $C_1$ and the engaged state of the shaft clutch $C_2$ through the changes-over of the ON and OFF states of the solenoids Sol.1 and Sol.2. When the shift is to be effected at the vehicle speed of 115 [km/h] or below, the turn-OFF of the solenoid Sol.A and the changes-over of the ON and OFF states of the solenoids Sol.1 and Sol.2 are simultaneously carried out.

In this manner, when the current speed stage is the second speed, which of the 2→3 gear shift and the 2→1 gear shift is more liable to take place is detected in accordance with the vehicle speed, so as to make preparations for either gear shift beforehand. Likewise, when the current speed stage is the third speed, which of the 3→4 gear shift and the 3→2 gear shift is more liable to take place is detected in accordance with the vehicle speed, so as to make preparations for either gear shift beforehand. Therefore, the gear shifts can be carried out very smoothly.

Incidentally, when the shift lever of the automatic transmission lies in the "L" range thereof, the ON and OFF states of the individual solenoids as indicated in FIG. 3 are set, whereby one of the speed stages is formed.

Besides, the reverse gear stage is formed in such a way that both the solenoids Sol.1 and Sol.2 are turned OFF, whereby the oil fed from the R-range port R of the manual valve is supplied to only the shaft clutch $C_2$, and that both the solenoids Sol.A and Sol.B are also turned OFF, whereby the dog clutch $D_r$ is engaged with the reverse side. This dog clutch $D_r$ is released to the neutral side at any speed stage in any range other than the reverse range (refer to FIG. 3).

In the twin clutch type automatic transmission having the basic arrangement as shown in FIGS. 2 and 3, when the dog clutch $D_r$ for the reverse stage and the dog clutch $D_2$ for the second and fourth speed stages which are respectively mounted on the identical power transmission shaft 16 are simultaneously brought into engagement, this output shaft is locked to incur the circulation of the power.

Certainly, when the supply of the working oil to the hydraulic cylinders of the hydraulic actuators in the basic hydraulic control circuit as explained above, is controlled by the manual valve, the pressures of the working oil are fundamentally changed-over without fail. However, the hydraulic cylinders expend certain time periods on their shift operations, and synchronizers are not immediately released by the mere change-over of oil lines or passages, so that the corresponding dog clutches are not quickly brought into the neutral states. For reliably preventing the power circulation, accordingly, it can be considered the most reliable method that, after one of the dog clutches $D_2$ and $D_r$ by way of example has fallen into the neutral state, the oil pressure is supplied to the other dog clutch.

Figure 1:
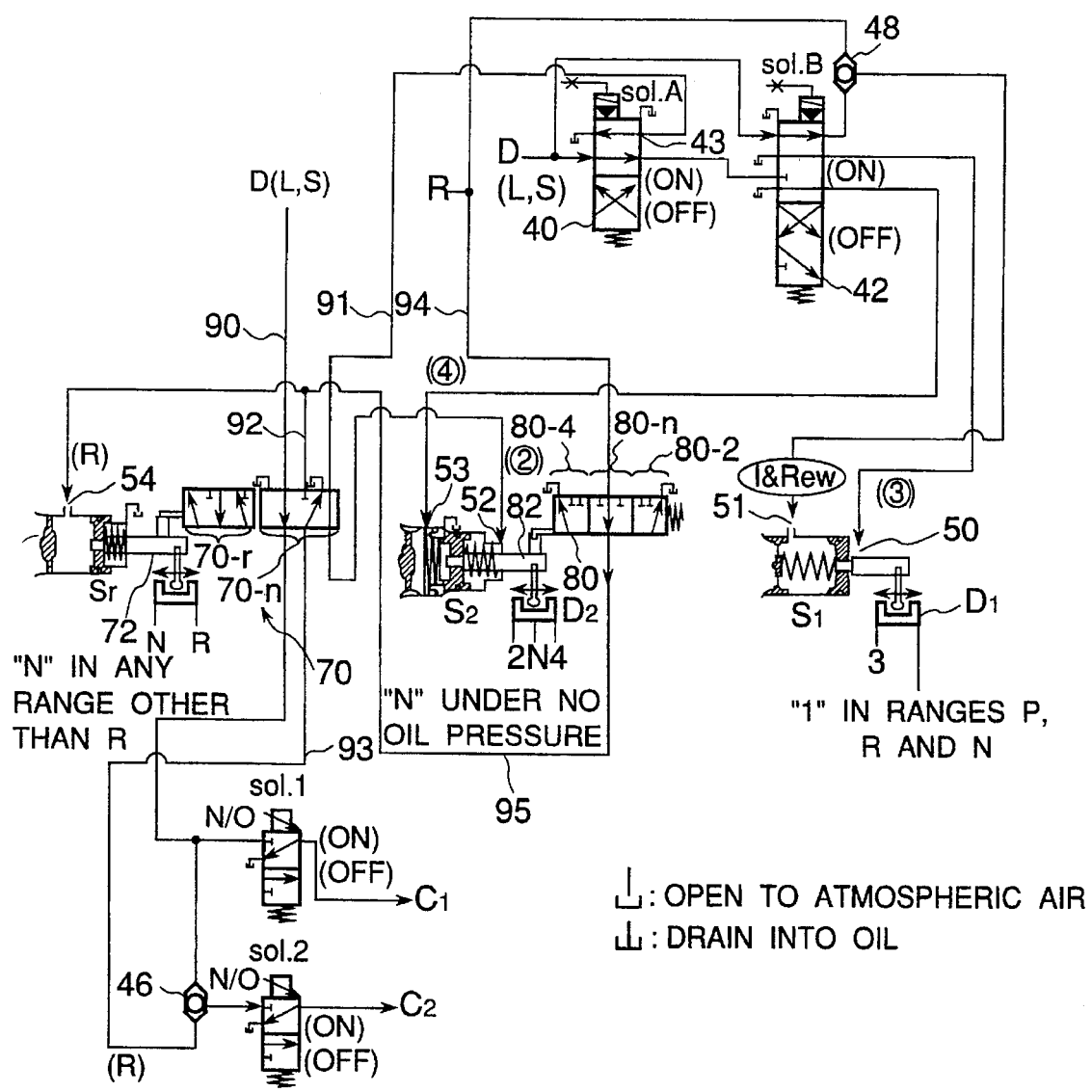
FIG. 1 is a diagram showing the hydraulic control circuit of a hydraulic control system to which the present invention is applied.

In this embodiment, the hydraulic control circuit having the fail-safe functions is constructed as shown in FIG. 1.

The hydraulic control circuit in FIG. 1 is additionally equipped with a "2-R" sequence valve 70 and an "R" cut valve 80 in order to implement the fail-safe functions according to this embodiment, compared to the basic hydraulic control circuit explained above. That is, the hydraulic control circuit in this embodiment is fundamentally identical to the foregoing hydraulic control circuit as regards the arrangement for forming the specific speed stages of the respective ranges. Accordingly, only the points of difference shall be described with note taken of the fail-safe functions.

The 2-R sequence valve 70 is controlled in mechanical interlocking with the movement of the piston rod 72 of the hydraulic actuator $S_r$ corresponding to the dog clutch $D_r$. It is so arranged as to lie on a "70-r" side in FIG. 1 when the dog clutch $D_r$ assumes the reverse side, and on a "70-n" side in the figure when the dog clutch $D_r$ assumes the neutral side.

In the case where the dog clutch Dr assumes the neutral side, the 2-R sequence valve 70 lies on the "70-n" side. Therefore, the oil fed from the drive range port D (including an L range port and an S range port) directly passes through the 2-R sequence valve 70 along an oil line 90. Thus, a hydraulic circuit which is substantially equivalent to the basic hydraulic circuit stated before is formed.

Also, an oil line 91 which connects the port 43 of the shift valve 40 with the port 52 of the hydraulic actuator $S_2$ corresponding to the dog clutch $D_r$ allows the oil to directly pass through the 2-R sequence valve 70, and holds the above ports 43 and 52 in communication when this valve 70 lies on the 70-n side. Therefore, a hydraulic circuit which is substantially equivalent to the foregoing is also formed.

However, when the 2-R sequence valve 70 lies at the 70-n position, oil lines 92 and 93 laid between the reverse range port R and the shuttle valve 46 are cut off, and the oil on the side of the shuttle valve 46 is connected with a drain.

On the other hand, in the case where the 2-R sequence valve 70 has been shifted to the R range position 70-r, the oil pressure from the reverse range port R is directly introduced into the shuttle valve 46 (along an oil line 94, the R cut valve 80, an oil line 95 and the oil line 92) in the same manner as in the basic hydraulic control circuit. However, in this case, both the oil lines 90 and 91 associated with the drive range port D are cut off by the 2-R sequence valve 70.

Meanwhile, the R cut valve 80 is shifted in mechanical interlocking with the movement of the piston rod 82 of the hydraulic actuator $S_2$ for controlling the dog clutch $D_2$. It is so arranged as to lie at a position 80-2 in FIG. 1 when the dog clutch $D_2$ is connected to the second speed side, at a position 80-4 in the figure when the dog clutch $D_2$ is connected to the fourth speed side, and at a position 80-n in the figure when the dog clutch $D_2$ is held at its neutral position.

Therefore, in the case where the dog clutch $D_2$ lies at the neutral position, the R cut valve 80 is brought to the position 80-n. Then, the pressure of the oil fed from the reverse range port R is directly led to the shuttle valve 46 (while passing through the 2-R sequence valve 70) in the same manner as in the prior-art hydraulic control circuit. However, in the case where the dog clutch $D_2$ has been shifted to the second speed side or the fourth speed side, the R cut valve 80 is brought to the position 80-2 or 80-4. Therefore, the oil pressure which has led from the reverse range port R to the R cut valve 80 along the oil line 94 is cut off by this R cut valve 80.

Herein, the oil line 95 which is laid on the side of the port 54 of the hydraulic actuator $S_r$ corresponding to the dog clutch $D_r$ is brought into communication with the drain at either of the valve positions 80-2 and 80-4. Therefore, when the dog clutch $D_2$ is connected to either of the second and fourth speed stages, the dog clutch $D_r$ is always held at the neutral position without fail.

Figure 4:
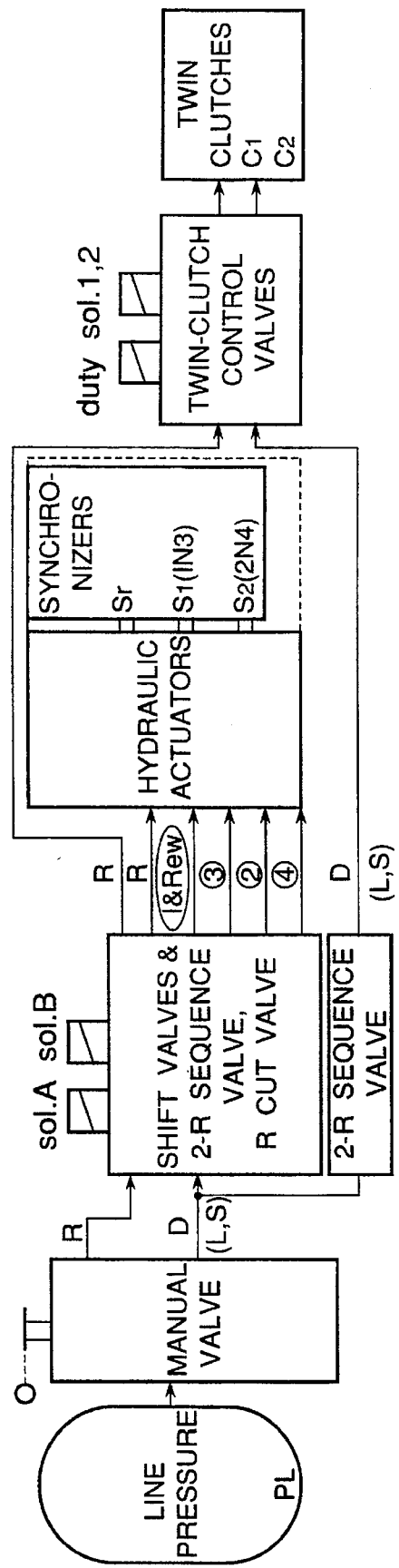
FIG. 4 is a block diagram showing the outline of the hydraulic control circuit depicted in FIG. 1.

By the way, the hydraulic control circuit according to this embodiment is schematically illustrated in separate blocks in FIG. 4.

Next, the operation of the hydraulic control circuit according to this embodiment will be explained.

In this hydraulic control circuit, when the shift lever has been manually shifted from the drive range to the reverse range, the R cut valve 80 is not shifted to the position 80-n unless the hydraulic actuator $S_2$ corresponding to the dog clutch $D_2$ shifts to the neutral side. Therefore, the oil does not flow to the oil line 95 associated with the R range. Accordingly, the oil is not supplied to the shaft clutch $C_2$, either. It is consequently possible to realize the fail-safe function as defined in claim 2; "when the reverse range has been selected, the engagement of the shaft clutch $C_2$ for the power transmission shaft 16 (on which the respective speed change gears $G_2$ and $G_4$ for forming the second and fourth forward speed stages are mounted) is prohibited on condition that the dog clutch $D_2$ for changing-over these speed change gears $G_2$ and $G_4$ so as to be capable of transmitting the power lies still at its position capable of transmitting the power".

Besides, when the shift lever has been shifted from the reverse range to the drive range (the forward range), no oil pressure is produced in association with the R range originally. Moreover, the oil of the oil line 90 associated with the D range is not allowed to enter the shaft clutch $C_2$ until the hydraulic actuator $S_r$ corresponding to the dog clutch $D_r$ has shifted to the neutral side to bring the 2-R sequence valve 70 to the 70-n side. It is consequently possible to realize the fail-safe function as defined in claim 3; "when the forward range has been selected, the engagement of the clutch $C_2$ for the power transmission shaft 16 (on which the speed change gear $G_r$ for forming the reverse gear stage is mounted) is prohibited on condition that the dog clutch $D_r$ for rendering this speed change gear $G_r$ capable of transmitting the power is still in the state capable of transmitting the power".

The above fail-safe functions can also be grasped from different viewpoints as follows: Unless the hydraulic actuator $S_2$ corresponding to the dog clutch $D_2$ shifts to the neutral side, the R cut valve 80 is not brought to the position 80-n. Therefore, the oil does not flow to the oil line 95 associated with the R range, and it does not flow into the R range port 54 of the hydraulic actuator $S_r$ corresponding to the dog clutch $D_r$, either. It is consequently possible to realize the fail-safe function as defined in claim 1; "in the state in which the dog clutch $D_2$ has selected either of the corresponding speed change gears (the speed change gear $G_2$ for the second speed and the speed change gear $G_4$ for the fourth speed) so as to render the selected gear capable of transmitting the power, the engagement of the other dog clutch $D_r$ mounted on the same power transmission shaft 16 (on which the dog clutch $D_2$ is mounted) is prohibited". In addition, unless the hydraulic actuator $S_r$ corresponding to the dog clutch $D_r$ shifts to the neutral side, the 2-R sequence valve 70 is not brought to the 70-n side, and the oil of the oil line 91 associated with the D range is not allowed to enter the second-speed-side port 52 of the hydraulic actuator $S_2$. It is consequently possible to realize the fail-safe function as defined in claim 1; "in the state in which the dog clutch $D_r$ has selected the corresponding speed change gear (the speed change gear $G_r$ for the reverse gear stage) so as to render the selected gear capable of transmitting the power, the engagement (with the second speed stage) of the other dog clutch $D_2$ mounted on the same power transmission shaft 16 (on which the dog clutch $D_r$ is mounted) is prohibited".

Thus, this embodiment can provide the construction adapted to prevent the occurrence of the circulation of the power even in such a case where the dog clutch which ought to become neutral in the specified range (for example, the forward range or the reverse range) lies in the engaged state due to the fail thereof or the response delay of the hydraulic control system.

As described above, according to the present invention, in the state in which a specific dog clutch has selected any one of a plurality of speed change gears so as to render the selected gear capable of transmitting power, the engagement of the other dog clutches mounted on the same power transmission shaft (on which said specific dog clutch is mounted) is prohibited. Therefore, two or more dog clutches are not simultaneously brought into engagement on the identical power transmission shaft, and the circulation of the power can be prevented from occurring.

Moreover, even when a dog clutch for forming a reverse gear stage lies in an engaged state in spite of the selection of a forward range, or conversely, when a dog clutch for forming a forward gear stage lies in an engaged state in spite of the selection of the reverse range, a shaft clutch for activating or deactivating the power transmission of a corresponding power transmission shaft (on which said dog clutch is mounted) is not brought into engagement. It is therefore possible to prevent the reverse gear stage from being formed in spite of the selection of the forward range, or vice versa.

What is claimed is:

1. A hydraulic control system for an automatic transmission of multiple clutch type, having at least two power transmission shafts each of which transmits power from a driving source to an output, shaft clutches each of which eather activates or deactivates the power transmission of said corresponding power transmission shaft, a plurality of speed change gears which are mounted on each of the power transmission shafts, dog clutches which select any one of the speed change gears and render the selected gear for transmitting the power, respectively, and hydraulic actuators which bring selected ones of the shaft clutches and the dog clutches into engagement, so as to form any one of a plurality of speed stages, respectively; comprising:

a cut valve whose positions are shifted by interlocking with an operation of one of said dog clutches, and which controls supply of working oil to the hydraulic actuator corresponding to dog clutches other than said one of said clutches mounted on the same power transmission shaft on which said one of said dog clutches is mounted, so as to prohibit an engagement of said dog clutches other than said one of said clutches mounted on the same power transmission shaft, such that said one dog clutches has selected either one of the corresponding speed change gears and is in a state in which the selected gear is capable of transmitting said power.

2. A hydraulic control system for an automatic transmission of multiple clutch type, having at least two power transmission shafts each of which transmits power from a driving source to an output, shaft clutches each of which either activates or deactivates the power transmission of the corresponding power transmission shaft, speed change gears for forward gear stages and a speed change gear for a reverse gear stage which are mounted on one of said power transmission shafts, dog clutches which select any one of the speed change gears and render the selected gear for transmitting the power, respectively, and hydraulic actuators which bring selected ones of the shaft clutches and the dog clutches into engagement, so as to form any one of the plurality of speed stages, respectively; comprising:

a working-oil supply line which serves to actuate the hydraulic actuator corresponding to said shaft clutch for said one of said power transmission shafts, so as to bring said shaft clutch into engagement, when a reverse range has been selected; and a cut valve whose positions are shifted by interlocking with an operation of one of said dog clutches that renders the speed change gears for the forward gear stages capable of transmitting said power, and which controls supply of working oil from said working-oil supply line to said hydraulic actuator corresponding to said-shaft clutch, so as to prohibit an engagement of said shaft clutch, such that said one dog clutch renders either one of said speed change gears for said forward gear stages capable of transmitting said power.

3. A hydraulic control system for an automatic transmission of multiple clutch type, having at least two power transmission shafts each of which transmits power from a driving source to an output, shaft clutches each of which either activates or deactivates the power transmission of the corresponding power transmission shaft, speed change gears for forward gear stages and a speed change gear for a reverse gear stage which are mounted on one of said power transmission shafts, dog clutches which select any one of the speed change gears and render the selected gear has for transmitting the power, respectively, and hydraulic actuators which bring selected ones of the shaft clutches and the dog clutches into engagement, so as to form any one of the plurality of speed stages, respectively; comprising:

a working-oil supply line which serves to actuate a hydraulic actuator corresponding to said shaft clutch for said one of said power transmission shafts, so as to bring said shaft clutch into engagement, when a forward range has been selected; and a cut valve whose positions are shifted by interlocking with an operation of one of said dog clutches that renders the reverse gear stage for transmitting said power, and which controls supply of working oil from said working-oil supply line to said hydraulic actuator corresponding to said shaft clutch, so as to prohibit an engagement of said shaft clutch, such that said one dog clutch renders said reverse gear stage capable of transmitting said power.

* * * * *